(No Model.)

T. A. EDISON.
PHONOGRAPH RECORDER.

No. 450,740.                 Patented Apr. 21, 1891.

WITNESSES:

INVENTOR
Thomas A. Edison
BY
ATTORNEYS

UNITED STATES PATENT OFFICE.

THOMAS A. EDISON, OF LLEWELLYN PARK, NEW JERSEY.

PHONOGRAPH-RECORDER.

SPECIFICATION forming part of Letters Patent No. 450,740, dated April 21, 1891.

Application filed July 17, 1888. Serial No. 280,205. (No model.)

*To all whom it may concern:*

Be it known that I, THOMAS A. EDISON, a citizen of the United States, residing at Llewellyn Park, in the county of Essex, in the State of New Jersey, have invented a certain new and useful Improvement in Phonograph-Recorders, (Case No. 787,) of which the following is a specification.

This invention relates to the recording-instrument of my phonograph; and its object is to simplify the construction of such instrument, and, further, to adapt such instrument for adjustment to make it most effective with voices differing in pitch and volume. I have found that an increased efficiency is given the recorder if it is capable of adjustment, so as to be more sensitive when used by people having weak voices. With voices of greater volume I have also found that it is necessary to reduce this sensitiveness.

Figure 1:
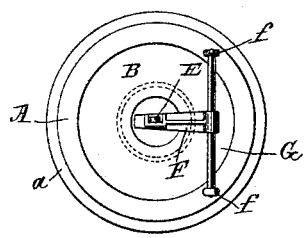
Figure 2:
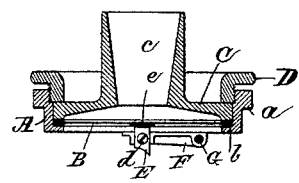

In the accompanying drawings, forming a part hereof, Figure 1 is a bottom view of the recorder, and Fig. 2 is a vertical section of the same.

My phonograph-recorder is composed of a ring A, which is adapted to fit one of the eyes of the spectacle-frame of my phonograph, and has an external shoulder $a$, which rests on the spectacle-frame. This ring is bored out, leaving at its bottom an internal shoulder $b$. Upon the shoulder $b$ rests the glass diaphragm B, which is held at its edge between two rubber rings, one being placed below and the other above the edge of the glass diaphragm. Above the diaphragm is inserted in the ring A a follower-plate C, which rests upon the rubber ring above the diaphragm and is hollowed out, so as to leave a space between it and the diaphragm. This follower-plate has a tube $c$ arising from it, to which is connected the flexible speaking-tube of the phonograph.

The ring A is internally screw-threaded at its upper portion and receives a screw-ring D, which turns within the ring A down upon the edge of the plate C. The plate C does not turn when the screw-ring is turned, but is forced with more or less pressure upon the rubber ring above the diaphragm. It will be seen that by turning the screw-ring D, which forms a nut, the diaphragm will be clamped with more or less firmness, according to the adjustment of the screw-ring. If the diaphragm is held with a light pressure, it will be much more sensitive to sound-vibrations than if clamped firmly. Thus the recorder is given the capacity for adjustment to adapt it to the voices of different operators. The best adjustment for each operator, of course, can only be determined by trying the effects of various adjustments by reproducing the sound-vibrations from the record.

It is evident that various constructions can be employed to make phonograph-recorders adjustable in their sensitiveness, and, while I prefer to use that just described, I wish it understood that my invention is not limited in its scope to the one construction.

The recording-point E of the recorder is a plate of steel held by a screw $d$, which passes laterally through this plate into a lever F. The plate E is secured to the center of the diaphragm by cement $e$. The recording-point is free to move freely through the entire amplitude of the diaphragm-vibrations, it being unobstructed by stops to regulate the distance of its movement. This plate is ground to a point at one edge, and this point is then buffed with rouge. By buffing the point it is given an exceedingly high polish, which is a matter of considerable importance, since without the buffing the point under the microscope shows a gray surface, which is an indication of the presence of minute points, which I have found to affect the clearness of the record. These points are removed by the buffing.

The lever F is a short stiff lever secured to a long pin G, which crosses the bottom of the ring A within its periphery, and is pivoted at its ends in blocks $f$, secured to the bottom of such ring. This long pin-bearing and the rigid lever make an exceedingly stiff support for the recording-point, and one which does not produce false vibrations. The lever is entirely free, except for the cementing of the recording-point to the diaphragm—*i. e.*, it has no spring which presses it either against the diaphragm or away from it. This simple construction I have found to be exceedingly efficient.

What I claim as my invention is—

1. In a phonograph-recorder, the combination, with a recording-point, of the diaphragm, the follower-plate, and the screw-ring, substantially as set forth.

2. In a phonograph-recorder, the combination, with the diaphragm and holding-ring, of a free lever mounted in bearings upon such holding-ring, and an indenting-point mounted upon such lever and attached directly to the diaphragm, substantially as set forth.

3. In a phonograph-recorder, the combination, with the diaphragm and the holding-ring, of a short stiff lever, a long pin-bearing to which such lever is secured, such pin being pivoted on the holding-ring, and the indenting-point secured to the free end of the stiff lever and attached to the diaphragm, such lever being free to turn on its bearing except for the attachment of the indenting-point to the diaphragm, substantially as set forth.

This specification signed and witnessed this 14th day of July, 1888.

THOS. A. EDISON.

Witnesses:
WILLIAM PELZER,
A. W. KIDDLE.